United States Patent
Shibata et al.

(10) Patent No.: US 8,988,033 B2
(45) Date of Patent: Mar. 24, 2015

(54) MACHINE TOOL

(71) Applicant: OKUMA Corporation, Aichi (JP)

(72) Inventors: Tomohiro Shibata, Aichi (JP); Tomohisa Kameyama, Aichi (JP)

(73) Assignee: OKUMA Corporation, Aichi (JP)

( * ) Notice: Subject to any disclaimer, the term of this patent is extended or adjusted under 35 U.S.C. 154(b) by 243 days.

(21) Appl. No.: 13/654,546

(22) Filed: Oct. 18, 2012

(65) Prior Publication Data

US 2013/0099719 A1 Apr. 25, 2013

(30) Foreign Application Priority Data

Oct. 21, 2011 (JP) .................. 2011-231534

(51) Int. Cl.
*G05B 5/01* (2006.01)
*G01B 21/04* (2006.01)

(52) U.S. Cl.
CPC ....................... *G01B 21/04* (2013.01)
USPC ........... 318/619; 318/611; 318/560; 318/616; 318/617; 702/149; 702/151; 702/152; 702/153; 702/155; 700/160; 700/164; 700/159; 700/170

(58) Field of Classification Search
CPC .... D05B 21/00; G01B 21/045; G05B 19/188; G05B 2219/32073; G05B 2219/35565; G05B 2219/37002; G05B 2219/37444
USPC .......... 318/571–689, 560; 700/159–195, 303; 702/155, 94, 95, 96, 104, 149, 151, 702/152, 153, 157
See application file for complete search history.

(56) References Cited

U.S. PATENT DOCUMENTS

| | | | | |
|---|---|---|---|---|
| 3,739,158 A | * | 6/1973 | Woodward | 318/571 |
| 3,970,830 A | * | 7/1976 | White et al. | 700/187 |
| 4,135,238 A | * | 1/1979 | Hamill et al. | 700/180 |
| 4,964,071 A | * | 10/1990 | Grosvenor | 702/157 |
| 5,083,280 A | * | 1/1992 | Yamamoto et al. | 700/188 |
| 6,163,130 A | * | 12/2000 | Neko et al. | 318/806 |

(Continued)

FOREIGN PATENT DOCUMENTS

| JP | 8313242 A | 11/1996 |
|---|---|---|
| JP | 2010032373 A | 2/2010 |

OTHER PUBLICATIONS

Patent Abstracts of Japan, Publication No. JP8313242, Published on Nov. 29, 1996, 1 page.

(Continued)

*Primary Examiner* — Rita Leykin
(74) *Attorney, Agent, or Firm* — Osha Liang LLP

(57) ABSTRACT

A machine tool includes a main axis 30 to which a touch probe 17 is attached, a motor 15 that rotationally drives the main axis 30, a rotation angle position detector 16 that detects a rotation angle position of the motor 15, and a control device 20. The control device, when a measurement mode command for performing measurement of a workpiece by the touch probe 17 is input, multiplies a d-axis current command value Idc by a d-axis current correction coefficient K that is less than 1 to reduce the d-axis current command value Idc to a d-axis current command correction value Idc', using a d-axis current command correction section 4. Thus, in the machine tool, small rotation vibrations of the main axis, generated when rotating the main axis to which the probe is attached and performing measurements of a workpiece, can be suppressed to thereby increase the measurement accuracy.

13 Claims, 3 Drawing Sheets

(56) References Cited

U.S. PATENT DOCUMENTS

| | | | |
|---|---|---|---|
| 6,526,670 B1 * | 3/2003 | Carli | 33/503 |
| 6,758,640 B2 * | 7/2004 | Mizutani et al. | 409/131 |
| 6,856,854 B2 * | 2/2005 | Endo et al. | 700/186 |
| 7,056,072 B2 * | 6/2006 | Mizutani et al. | 409/131 |
| 7,110,854 B2 * | 9/2006 | Kajiyama | 700/188 |

OTHER PUBLICATIONS

Patent Abstracts of Japan, Publication No. JP2010032373, Published on Feb. 12, 2010, 1 page.

* cited by examiner

MACHINE TOOL

PRIORITY INFORMATION

This application claims priority to Japanese Patent Application No. 2011-231534, filed on Oct. 21, 2011, which is incorporated herein by reference in its entirety.

BACKGROUND

1. Technical Field

The present invention relates to a machine tool that performs position and dimension measurements of a workpiece.

2. Background Art

In machine tools, a touch probe (touch sensor) is attached to a main axis thereof to perform position measurement for positioning a workpiece and dimension measurement of a workpiece during setup or the like. A touch probe includes a stylus serving as a measuring element. Such touch probes are categorized into a contact point signal type in which a stylus is inclined by coming into contact with a surface to be measured to thereby change a mechanical contact point and a touch signal type that detects a state in which a stylus touches and is in contact with a surface to be measured, thus establishing electrical connection with the surface to be measured. With the measurement performed by either type of touch probe, a touch probe and a workpiece are moved relative to each other in a direction in which the stylus approaches the surface to be measured to thereby bring the stylus in contact with the surface to be measured of the workpiece, and measurement of the position and dimension of the workpiece is performed by reading NC coordinates at this contact time (see JP 8-313242 A, for example).

In a method of performing measurement of the position and dimension of a workpiece by a touch probe as described in JP 8-313242 A, because the touch probe moves linearly, there are cases in which it is not possible to perform measurement of the shape of a surface of a workpiece having a small radius of curvature and a surface of a spherical workpiece. In order to address these disadvantages, there is suggested a method in which a touch probe is, for example, attached to a main axis and performs simultaneous multi-axis measurement including a linear drive axis and a rotation axis by bringing the same tip end point of the touch probe in contact with the surface of the workpiece (see JP 2010-32373 A).

SUMMARY

Here, when a touch probe is attached to a main axis or the like to thereby perform position and dimension measurements of a workpiece by simultaneous multi-axis measurement including a linear drive axis and a rotation axis as in the conventional art described in JP 2010-32373 A, it is necessary to measure the rotation angle position of the main axis with high accuracy. However, there are cases in which when slight noise is input to a position detector that detects the rotation angle position of the main axis, vibrations in the rotation direction are generated in the main axis due to the effects of such noise.

In order to address the above problem, a method can be considered in which an output of the position detector is filtered and the filtered value is used as a position detection value, thereby suppressing the slight vibration of the motor that drives the main axis so that measurement of a workpiece can be performed with high accuracy. With this method, however, because, when the filtering constant is increased, the accuracy in detecting the angular position is lowered in the positioning operation during normal rotation of the main axis, there is a limitation for increasing the filtering constant of the position detection value. This results in a problem that when small noise having a frequency that is higher than the filtering constant is input to the position detector, the small noise cannot be removed by the filter and therefore a torque with the small noise components are generated in the motor, which causes the main axis to slightly vibrate in the rotation direction in accordance with the small noise components of the position detection value and makes it impossible to measure the position and dimension of a workpiece with high accuracy.

The present invention is aimed at suppressing slight rotation vibrations of the main axis generated when rotating the main axis to which a probe is attached to perform measurement of a workpiece, and enhancing the accuracy in measurement of a workpiece.

In accordance with an aspect of the invention, there is provided a machine tool including a main axis to which a probe is attached, a motor that rotationally drives the main axis, a rotation angle position detector that detects a rotation angle position of the motor, and a control device that adjusts electric power to be supplied to the motor based on the rotation angle position of the motor that is detected by the rotation angle position detector, wherein the control device includes a switching unit that, when a measurement mode command for performing measurement of a workpiece by the probe is input, switches a variation ratio of the electric power to be supplied to the motor in accordance with an output variation ratio of the rotation angle position detector from a normal variation ratio to a measurement mode variation ratio.

Preferably, in the machine tool of the present invention, the switching unit of the control device switches a d-axis current command value to be supplied to the motor to a measurement mode command value that is lower than a normal command value.

Preferably, in the machine tool of the present invention, a current detector that detects electric current to be supplied to the motor is provided, and the control device adjusts the electric current to be supplied to the motor by feedback of a d-axis current detection value and a q-axis current detection value that are calculated from an output of the rotation angle position detector and an output of the current detector to a d-axis current command value and a q-axis current command value, respectively, that are based on a rotation rate command, and the switching unit switches a gain of the feedback to a measurement mode gain that is smaller than a normal gain.

Preferably, in the machine tool of the present invention, the rotation angle position detector includes an object to be detected that is coupled with a rotation axis of the motor, and a position detection sensor that detects an angular position of the object to be detected.

Preferably, in the machine tool of the present invention, the motor is driven by three-phase alternating power that is obtained by converting direct current power supplied from a direct current power source, the control device includes a current command operation section that outputs two-phase command values formed of a d-axis current command value and a d-axis current command value based on a rotation rate command and a rotation rate detection value obtained by the rotation angle position detector, a first coordinate conversion section that detects three-phase current of the motor and converts the detected three-phase current into two-phase detection values formed of a q-axis current detection value and a d-axis current detection value, a q-axis voltage error operation section that outputs a q-axis voltage command based on the q-axis current command value and the q-axis current detection value, a d-axis voltage error operation section that outputs a d-axis voltage command based on the d-axis current command value and the d-axis current detection value, and a second coordinate conversion section that converts a two-phase command formed of the g-axis voltage command and the d-axis voltage command into a three-phase voltage command for controlling the electric current of the motor, and the switching unit reduces each gain when calculating the q-axis voltage command and the d-axis voltage command in the q-axis voltage error operation section and the d-axis voltage error operation section.

In accordance with another aspect of the invention, there is provided a method of controlling a motor in a machine tool comprising a main axis to which a probe is attached, a motor that rotationally drives the main axis, and a rotation angle position detector that detects a rotation angle position of the motor, the method including detecting a rotation angle position of the motor by the rotation angle position detector, and switching a variation ratio of electric power to be supplied to the motor in accordance with an output variation ratio of the rotation angle position detector from a normal variation ratio to a measurement mode variation ratio, when a measurement mode command for performing measurement of a workpiece by the probe is input.

The present invention provides an advantage that, in a machine tool, small rotation vibrations of a main axis, generated when rotating the main axis to which a probe is attached and performing measurements of a workpiece, are suppressed to thereby increase the measurement accuracy.

BRIEF DESCRIPTION OF THE DRAWINGS

Preferred embodiments of the present invention will be described in detail based on the following figures, wherein.

DESCRIPTION OF EMBODIMENTS

Preferred embodiments of the present invention will be described in detail with reference to the accompanying drawings.

Figure 1:
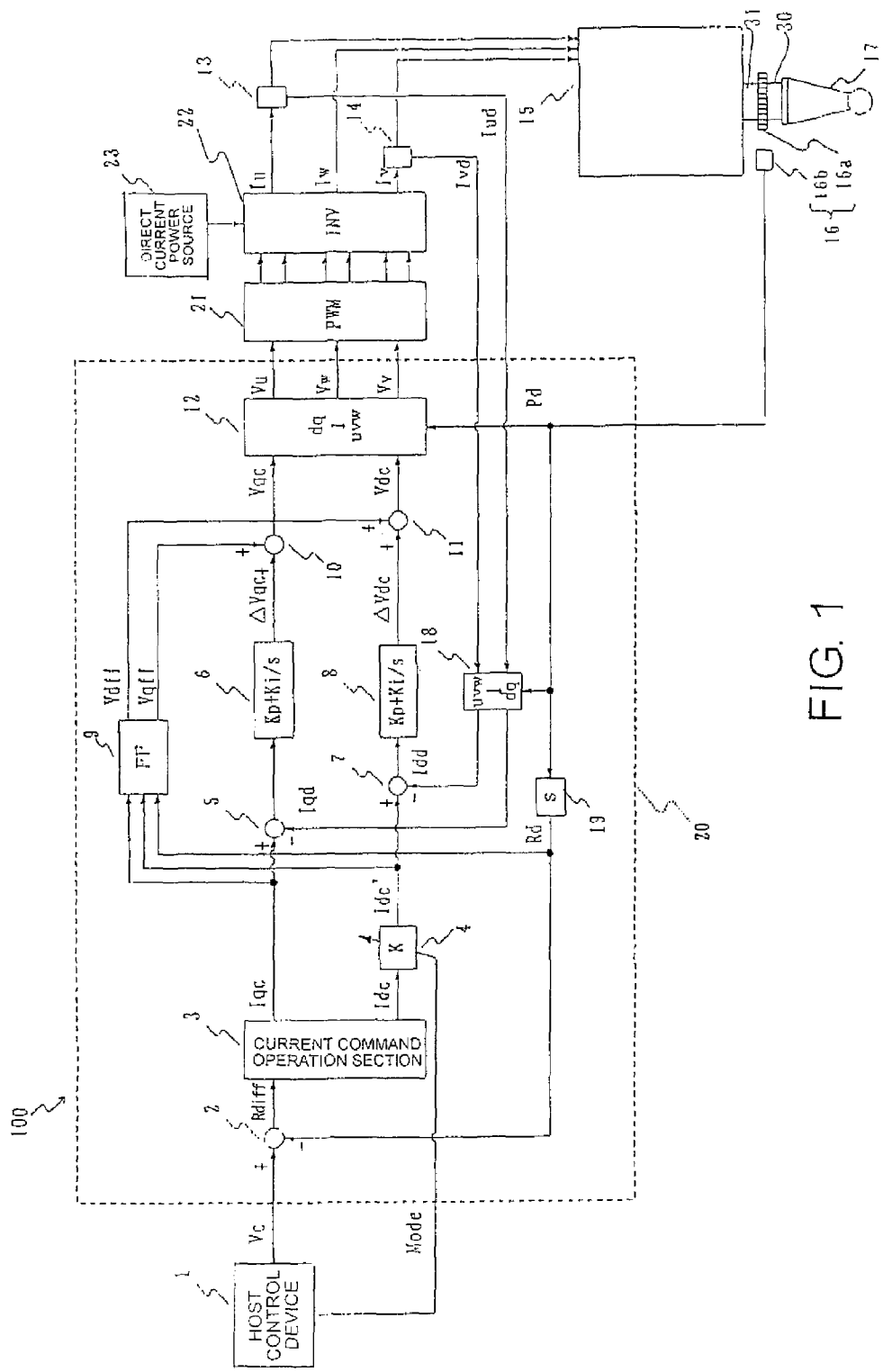
FIG. 1 is a block diagram illustrating a motor control device of a machine tool according to an embodiment of the present invention.

As illustrated in FIG. 1, a machine tool according to an embodiment of the present invention includes a main axis 30 to which a touch probe 17 is attached, a motor 15 for driving and rotating the main axis 30, a rotation angle position detector 16 that is composed of a detection gear 16a that is an element to be detected, directly coupled with a rotation axis 31 of the motor 15 and a magnetic resistance sensor 16b that is a position detecting sensor for detecting a magnetic flux density that varies due to the detection gear 16a, an inverter 22 that converts direct current power supplied from a direct current power source 23 into three-phase alternating current power to drive the motor 15, a U-phase current detector 13 for detecting the U-phase current of the three-phase alternating current power to be supplied to the motor 15, a V-phase current detector 14 for detecting the V-phase current, a control device 20 to which an output from each of the rotation angle position detector 16, the U-phase current detector 13, and the V-phase current detector is input and which outputs voltage command values Vu, Vv, and Vw of U-phase, V-phase, and W-phase, respectively, and a PWM section 21 for setting the voltage command values Vu, Vv, and Vw of U-phase, V-phase, and W-phase output from the control device 20, as an on-off signal for each switching element of the inverter 22. The machine tool 100 further includes a host control device 1 that outputs a rotation rate command Rc and a measurement mode command to the control device 20.

The control device 20 includes a first coordinate conversion section 18, a differentiator 19, a subtractor 2, a current command operation section 3, a d-axis current command correction section 4, subtractors 5 and 7, a q-axis voltage error operation section 6, a d-axis voltage error operation section 8, a voltage feedforward value operation section 9, adders 10 and 11, and a second coordinate conversion section 12.

The first coordinate conversion section 18 converts the three-phase current detection value into a d-axis current detection value Idd and a q-axis current detection value Iqd that are two-phase current detection values, based on the U-phase current Iu detected by the U-phase current detector 13, the V-phase current Iv detected by the V-phase current detector 14, and the rotation angle position detection value Pd detected by the rotation angle position detector 16.

The differentiator 19 differentiates the rotation position detection value Pd to output a rotation rate detection value Rd of the motor.

The subtractor 2 obtains a deviation between the rotation rate command Rc and the rotation rate detection value Rd and outputs the result as a rate deviation Rdif. The current command operation section 3 outputs a d-axis current command value Idc and a q-axis current command value Iqc that are two-phase current command values based on the rate deviation Rdif.

Figure 2:
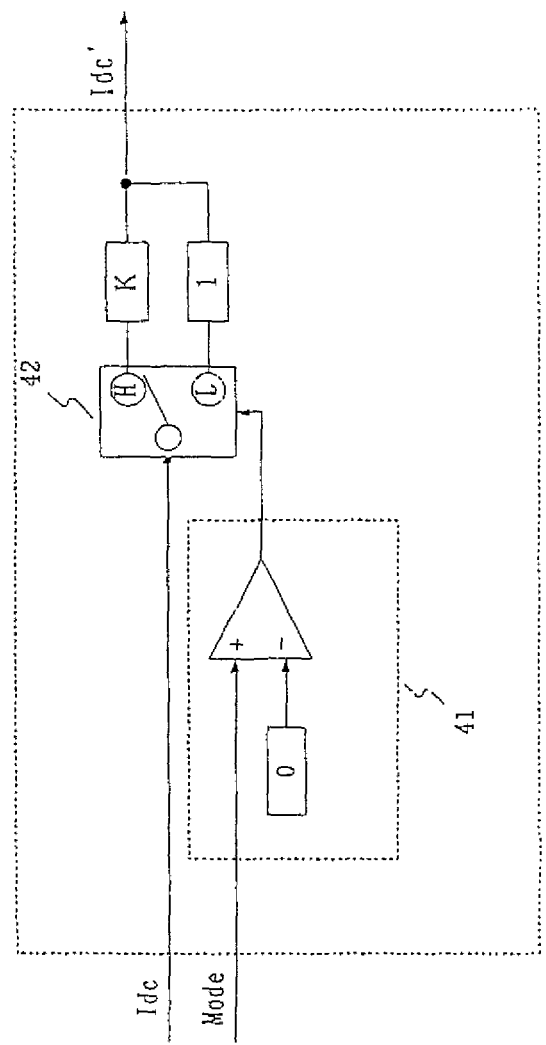
FIG. 2 is a block diagram of a voltage error detector of the motor control device of a machine tool according to the embodiment of the present invention.

The d-axis current command correction section 4 switches the d-axis current command value Idc between a normal command value and a measurement mode command value based on a during-measurement signal Mode, which is input from the host control device 1, and outputs the result as a d-axis current command correction value Idc'. As illustrated in FIG. 2, the d-axis current command correction section 4 includes a measurement mode determination section 41 and a d-axis current correction value switching section 42. The measurement mode determination section 41, when the during-measurement signal Mode in input, switches a switch of the d-axis current correction value switching section 42 to the measurement mode side and sets a d-axis current correction coefficient K to a value which is less than 1. Further, when the during-measurement signal Mode in not input, the measurement mode determination section 41 switches the switch of the d-axis current correction value switching section 42 to the normal mode side and sets a normal d-axis current correction coefficient K to 1, and the d-axis current command correction value Idc' is output.

The subtractor 5 obtains a deviation between the q-axis current command value Iqc and the q-axis current detection value Iqd and outputs the result as a q-axis current deviation. The q-axis voltage error operation section 6 outputs a q-axis current voltage error ΔVqc based on the q-axis current deviation, a proportional gain Kp and an integration gain Ki. Further, the subtractor 7 obtains a deviation between the d-axis current command correction value Idc' and the d-axis current detection value Idd and outputs the result as a d-axis current deviation. The d-axis voltage error operation section 8 outputs a d-axis current voltage error ΔVdc based on the d-axis current deviation, the proportional gain Kp and the integration gain Ki.

The voltage feedforward value operation section 9 outputs a d-axis current voltage feedforward value Vdff and a q-axis current voltage feedforward value Vqff based on the rotation rate detection value Rd, the d-axis current command value Idc', and the q-axis current command value Iqc. The adder 11 outputs a d-axis voltage command Vdc based on the d-axis current voltage feedforward value Vdff and the d-axis current voltage error ΔVdc, and the adder 10 outputs a q-axis voltage command Vqc based on the q-axis current voltage feedforward value Vqff and the q-axis current voltage error ΔVqc. The second coordinate conversion section 12 outputs voltage command values Vu, Vv, and Vw of U-phase, V-phase, and W-phase, respectively, based on the d-axis voltage command Vdc, the q-axis voltage command Vqc, and the rotation angle position detection value Pd.

When the during-measurement signal Mode is OFF, i.e. during rotation of the main axis, as the d-axis current command value Idc is multiplied by 1, the d-axis current command correction value Idc' and the d-axis current command value Idc are the same value, so that the operation of the machine tool 100 is not changed. When the during-measurement signal Mode is ON, on the other hand, i.e, during the measurement mode for measuring the position and dimension of a workpiece by the touch probe 17, rather than the machining mode, as the d-axis current command value Idc is multiplied by the d-axis current correction coefficient K that is less than 1, the d-axis current command value Idc is decreased. More specifically, the variation ratio of the supply power to the motor in accordance with the output variation ratio of the rotation angle position detector 16 is switched from a normal variation ratio to a measurement mode variation ratio. By decreasing the d-axis current command value Idc, the output torque of the motor 15 lowers in proportion to the amount of decrease. Accordingly, because, during the measurement mode with the touch probe 17, rather than the machining mode, even when small noise is contained in the rotation angle position detection value Pd, the output torque based on the small noise is lowered by decreasing the d-axis current command value Idc to the d-axis current command correction value Idc', the rotation vibrations of the motor 15 and the main axis 30 are suppressed so as to follow the small noise, so that position and dimension measurements of a workpiece can be performed with the touch probe 17 at high accuracy.

Figure 3:
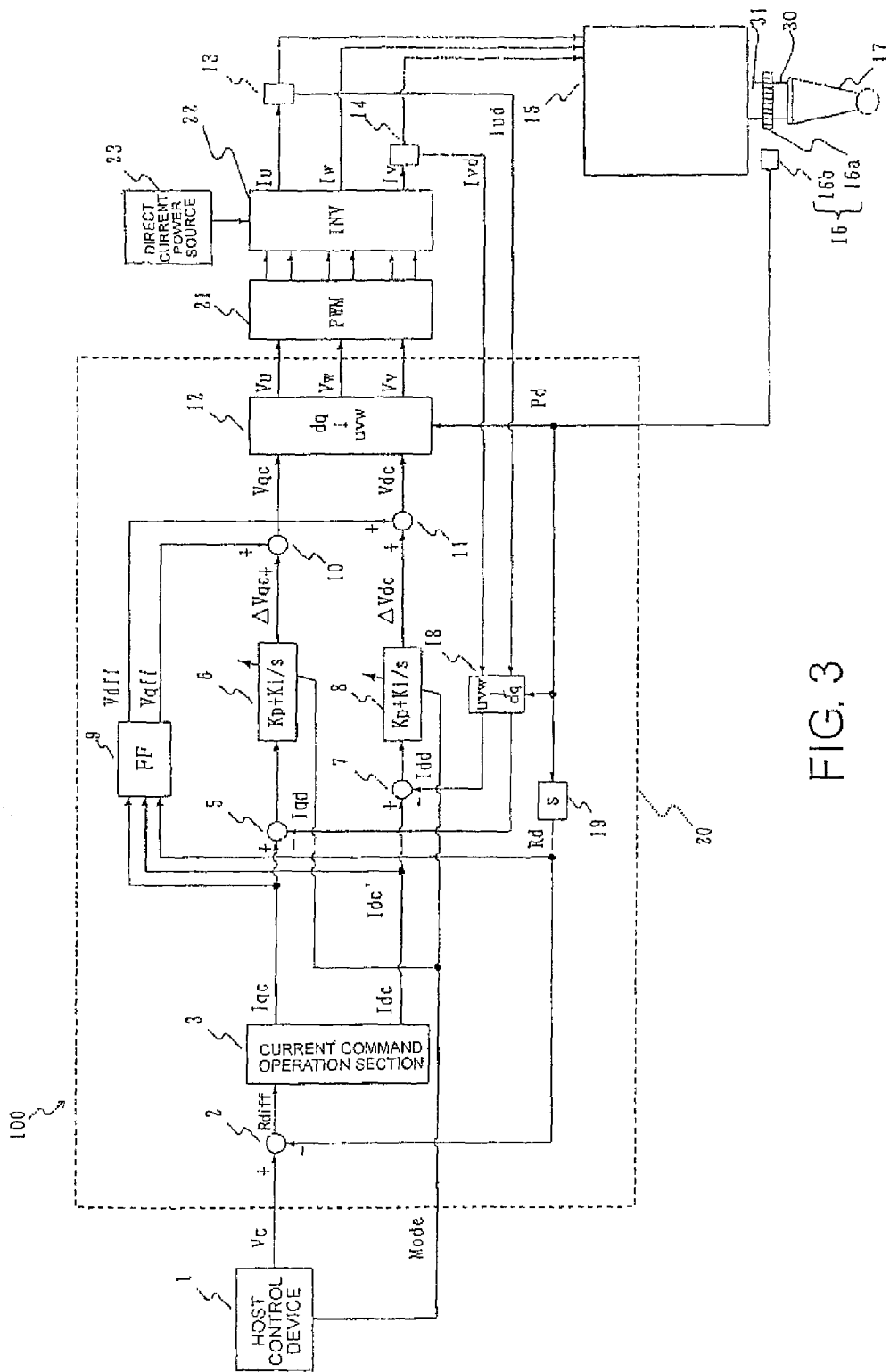
FIG. 3 is a block diagram illustrating a motor control device of a machine tool according to another embodiment of the present invention.

Another embodiment of the present invention will be described. In this embodiment, elements that are similar to those in the embodiment described above with reference to FIG. 1 are denoted with the similar reference numerals and will not be described. As illustrated in FIG. 3, in the present embodiment, the d-axis current command correction section 4 in the embodiment described with reference to FIG. 1 is not provided, and the during-measurement signal Mode input from the host control device 1 is input to the q-axis voltage error operation section 6 and the d-axis voltage error operation section 8.

When the during-measurement signal Mode is OFF, i.e. during normal rotation of the main axis, as the q-axis voltage error operation section 6 and the d-axis voltage error operation section 8 operate and output the q-axis current voltage error ΔVqc and the d-axis current voltage error ΔVdc by using the proportional gain Kp and the integration gain Ki that are normal gains, the operation of the machine tool 100 is not changed. When the during-measurement signal Mode is ON, on the other hand, i.e, during the measurement mode for measuring the position and dimension of a workpiece by the touch probe 17, rather than the machining mode, the q-axis voltage error operation section 6 and the d-axis voltage error operation section 8 operate and output the q-axis current voltage error ΔVqc and the d-axis current voltage error ΔVdc by using a measurement mode proportional gain Kp' and a measurement mode integration gain Ki' that are lower than the normal proportional gain Kp and the normal integration gain Ki. More specifically, the variation ratio of the supply power to the motor in accordance with the output variation ratio of the rotation angle position detector 16 is switched from a normal variation ratio to a measurement mode variation ratio. Consequently, the current Iu, Iv, Tw of the U-phase, V-phases, and W-phase, respectively, to be supplied to the motor 15 is reduced, to thereby reduce the output torque of the motor 15. Accordingly, during the measurement mode with the touch probe 17, not the machining mode, even when small noise is contained in the rotation angle position detection value Pd, the output torque based on the small noise is lowered. Consequently, the rotation vibrations of the motor 15 and the main axis 30 are suppressed so as to follow the small noise, so that position and dimension measurements of a workpiece can be performed with the touch probe 17 at high accuracy.

As described above, according to the embodiment described with reference to FIG. 1, the d-axis current command correction section 4, when the during-measurement signal Mode is input thereto from the host control device 1, changes the switch of the d-axis current correction value switching section 42 to the measurement mode side to make the d-axis current correction coefficient K into a value which is less than 1, thereby reducing the output torque of the motor. Accordingly, even when small noise is contained in the rotation angle position detection value Pd, it is possible to perform position and dimension measurements of a workpiece with the touch probe 17 at high accuracy, while suppressing the rotation vibrations of the main axis 30. Further, according to the embodiment described with reference to FIG. 2, when the during-measurement signal Mode is ON, by operating and outputting the q-axis current voltage error ΔVqc and the d-axis current voltage error ΔVdc with the measurement mode proportional gain Kp' and the measurement mode integration gain Ki' that are lower than the normal proportional gain Kp and the normal integration gain Ki, the output torque of the motor is lowered, and even when small noise is contained in the rotation angle position detection value Pd, the rotation vibrations of the main axis 30 are suppressed, so that position and dimension measurements of a workpiece can be performed with the touch probe 17 at high accuracy. Further, still another embodiment may be configured such that the d-axis current command correction section 4 in the embodiment illustrated in FIG. 1 is provided, and that the during-measurement signal Mode is input to the q-axis voltage error operation section 6 and the d-axis voltage error operation section 8 to decrease the proportional gain Kp and the integration gain Ki as in the embodiment illustrated in FIG. 2, and, when the during-measurement signal Mode is ON, the d-axis current correction coefficient K is set to a value which is less than 1 and also each of the gains Kp and Ki is decreased.

While the preferred embodiments of the present invention have been described using specific terms, such description is for illustrative purposes only, and it is to be understood that changes and variations may be made without departing from the spirit or scope of the appended claims.

What is claimed is:

1. A machine tool, comprising:
  a main axis to which a probe is attached, the probe configured to measure a position or dimension of a tool for maintaining a workpiece or a position or dimension of a workpiece;

a motor that rotationally drives the main axis;
a rotation angle position detector that detects a rotation angle position of the motor; and
a control device that adjusts electric power to be supplied to the motor based on the rotation angle position of the motor that is detected by the rotation angle position detector,
wherein the control device includes a switching unit that, when a measurement mode command for performing measurement of the workpiece position or dimension by the probe is input, switches a variation ratio of the electric power to be supplied to the motor in accordance with an output variation ratio of the rotation angle position detector from a normal variation ratio used for workpiece machining to a measurement mode variation ratio.

2. The machine tool according to claim 1, wherein the switching unit of the control device switches a d-axis current command value to be supplied to the motor to a measurement mode command value that is lower than a normal command value used for workpiece machining.

3. The machine tool according to claim 1, comprising:
a current detector that detects electric current to be supplied to the motor,
wherein the control device adjusts the electric current to be supplied to the motor by feedback of a d-axis current detection value and a q-axis current detection value that are calculated from an output of the rotation angle position detector and an output of the current detector to a d-axis current command value and a q-axis current command value, respectively, that are based on a rotation rate command, and the switching unit switches a gain of the feedback to a measurement mode gain that is smaller than a normal gain used for workpiece machining.

4. The machine tool according to claim 2, comprising:
a current detector that detects electric current to be supplied to the motor,
wherein the control device adjusts the electric current to be supplied to the motor by feedback of a d-axis current detection value and a q-axis current detection value that are calculated from an output of the rotation angle position detector and an output of the current detector to a d-axis current command value and a q-axis current command value, respectively, that are based on a rotation rate command, and the switching unit switches a gain of the feedback to a measurement mode gain that is smaller than a normal gain used for workpiece machining.

5. The machine tool according to claim 1, wherein the rotation angle position detector includes an object to be detected that is coupled with a rotation axis of the motor, and a position detection sensor that detects an angular position of the object to be detected.

6. The machine tool according to claim 2, wherein the rotation angle position detector includes an object to be detected that is coupled with a rotation axis of the motor, and a position detection sensor that detects an angular position of the object to be detected.

7. The machine tool according to claim 3, wherein the rotation angle position detector includes an object to be detected that is coupled with a rotation axis of the motor, and a position detection sensor that detects an angular position of the object to be detected.

8. The machine tool according to claim 4, wherein the rotation angle position detector includes an object to be detected that is coupled with a rotation axis of the motor, and a position detection sensor that detects an angular position of the object to be detected.

9. The machine tool according to claim 1,
wherein the motor is driven by three-phase alternating power that is obtained by converting direct current power supplied from a direct current power source, the control device comprises:
a current command operation section that outputs two-phase command values formed of a d-axis current command value and a d-axis current command value based on a rotation rate command and a rotation rate detection value obtained by the rotation angle position detector;
a first coordinate conversion section that detects three-phase current of the motor and converts the detected three-phase current into two-phase detection values formed of q-axis current detection value and a d-axis current detection value;
a q-axis voltage error operation section that outputs a q-axis voltage command based on the q-axis current command value and the q-axis current detection value;
a d-axis voltage error operation section that outputs a d-axis voltage command based on the d-axis current command value and the d-axis current detection value; and
a second coordinate conversion section that converts a two-phase command formed of the q-axis voltage command and the d-axis voltage command into a three-phase voltage command for controlling the electric current of the motor, and
wherein the switching unit reduces each gain when calculating the q-axis voltage command and the d-axis voltage command in the q-axis voltage error operation section and the d-axis voltage error operation section.

10. The machine tool according to claim 2,
wherein the motor is driven by three-phase alternating power that is obtained by converting direct current power supplied from a direct current power source, the control device comprises:
a current command operation section that outputs two-phase command values formed of a d-axis current command value and a d-axis current command value based on a rotation rate command and a rotation rate detection value obtained by the rotation angle position detector;
a first coordinate conversion section that detects three-phase current of the motor and converts the detected three-phase current into two-phase detection values formed of q-axis current detection value and a d-axis current detection value;
a q-axis voltage error operation section that outputs a q-axis voltage command based on the q-axis current command value and the q-axis current detection value;
a d-axis voltage error operation section that outputs a d-axis voltage command based on the d-axis current command value and the d-axis current detection value; and
a second coordinate conversion section that converts a two-phase command formed of the q-axis voltage command and the d-axis voltage command into a three-phase voltage command for controlling the electric current of the motor, and
wherein the switching unit reduces each gain when calculating the q-axis voltage command and the d-axis voltage command in the q-axis voltage error operation section and the d-axis voltage error operation section.

11. The machine tool according to claim 3,
wherein the motor is driven by three-phase alternating power that is obtained by converting direct current power supplied from a direct current power source, the control device comprises:

a current command operation section that outputs two-phase command values formed of a d-axis current command value and a d-axis current command value based on a rotation rate command and a rotation rate detection value obtained by the rotation angle position detector;

a first coordinate conversion section that detects three-phase current of the motor and converts the detected three-phase current into two-phase detection values formed of q-axis current detection value and a d-axis current detection value;

a q-axis voltage error operation section that outputs a q-axis voltage command based on the q-axis current command value and the q-axis current detection value;

a d-axis voltage error operation section that outputs a d-axis voltage command based on the d-axis current command value and the d-axis current detection value; and a second coordinate conversion section that converts a two-phase command formed of the q-axis voltage command and the d-axis voltage command into a three-phase voltage command for controlling the electric current of the motor, and wherein the switching unit reduces each gain when calculating the q-axis voltage command and the d-axis voltage command in the q-axis voltage error operation section and the d-axis voltage error operation section.

12. The machine tool according to claim 4, wherein the motor is driven by three-phase alternating power that is obtained by converting direct current power supplied from a direct current power source, the control device comprises:

a current command operation section that outputs two-phase command values formed of a d-axis current command value and a d-axis current command value based on a rotation rate command and a rotation rate detection value obtained by the rotation angle position detector;

a first coordinate conversion section that detects three-phase current of the motor and converts the detected three-phase current into two-phase detection values formed of q-axis current detection value and a d-axis current detection value;

a q-axis voltage error operation section that outputs a q-axis voltage command based on the q-axis current command value and the q-axis current detection value;

a d-axis voltage error operation section that outputs a d-axis voltage command based on the d-axis current command value and the d-axis current detection value; and a second coordinate conversion section that converts a two-phase command formed of the q-axis voltage command and the d-axis voltage command into a three-phase voltage command for controlling the electric current of the motor, and wherein the switching unit reduces each gain when calculating the q-axis voltage command and the d-axis voltage command in the q-axis voltage error operation section and the d-axis voltage error operation section.

13. A method of controlling a motor in a machine tool comprising a main axis to which a probe is attached, a motor that rotationally drives the main axis, and a rotation angle position detector that detects a rotation angle position of the motor, the probe configured to measure a position or dimension of a tool for machining a workpiece or a position or dimension of a workpiece, the method comprising:

detecting a rotation angle position of the motor using the rotation angle position detector; and switching a variation ratio of electric power to be supplied to the motor in accordance with an output variation ratio of the rotation angle position detector from a normal variation ratio used for workpiece machining to a measurement mode variation ratio, when a measurement mode command for performing measurement of the workpiece position or dimension by the probe is input.

\* \* \* \* \*